(12) United States Patent
Takagi et al.

(10) Patent No.: US 6,930,850 B2
(45) Date of Patent: Aug. 16, 2005

(54) HEAD CLAMPING APPARATUS FOR MAGNETIC DISK TESTER AND MAGNETIC DISK TESTER

(75) Inventors: Hitoshi Takagi, Yokohama (JP); Kiyotaka Fukuoka, Yokohama (JP); Mamoru Hatano, Yokohama (JP); Katsuhiro Fujii, Yokohama (JP)

(73) Assignee: Kyodo Denshi System Co., Ltd., Yokohama (JP)

( * ) Notice: Subject to any disclaimer, the term of this patent is extended or adjusted under 35 U.S.C. 154(b) by 401 days.

(21) Appl. No.: 09/987,007

(22) Filed: Nov. 13, 2001

(65) Prior Publication Data

US 2002/0057517 A1 May 16, 2002

(30) Foreign Application Priority Data

Nov. 13, 2000 (JP) .................................... P2000-345443
Apr. 9, 2001 (JP) .................................... P2001-110514
Aug. 7, 2001 (JP) .................................... P2001-239418

(51) Int. Cl.[7] ............................................. G11B 5/596
(52) U.S. Cl. ...................................... 360/77.03; 360/75
(58) Field of Search ................................ 360/75, 77.03, 360/78.05, 78.11, 109; 324/262, 210; 310/328; 73/865.9, 866.5; 325/212

(56) References Cited

U.S. PATENT DOCUMENTS 5,808,435 A * 9/1998 Mager .......................... 318/593
6,023,145 A * 2/2000 Karaaslan et al. .......... 318/652
6,229,664 B1 * 5/2001 Albrecht et al. .............. 360/75
6,242,910 B1 * 6/2001 Guzik et al. ................. 324/212
6,566,870 B2 * 5/2003 Sorenson et al. ............ 324/210

FOREIGN PATENT DOCUMENTS

JP 11-219572 A 8/1999
JP 2000-322850 A 11/2000
JP 2001-143412 A 5/2001

* cited by examiner

Primary Examiner—David Hudspeth
Assistant Examiner—K. Wong
(74) Attorney, Agent, or Firm—Smith Patent Office

(57) ABSTRACT

A magnetic disk tester has a head clamp (35, 218) to position a magnetic head (15, 289). The head clamp has a micromotion stage (55, 273) provided with a stage (59, 205) which is horizontally moved by a piezo-element (77). The magnetic head is attached to the piezo-stage (55, 273). On the head clamp (218), a reflective scale (222) is attached to a back face of the piezo-stage, and a laser head (217) is oriented toward the head clamp (218). According to a reflected laser beam from the reflective scale, the position of the magnetic head (289) is detected. An error signal indicating the difference between the detected position and a reference position is used to control the head clamp (218). The piezo-element can operate at high frequencies, to easily make the magnetic head trace a target track and improve the positioning accuracy of the magnetic head.

6 Claims, 15 Drawing Sheets

|      | ΔX/Tw |
|------|-------|
| E2   | 3     |
| A2   | 2     |
| E1   | 1     |
| A1   | 0.5   |
| B    | 0     |
| C2   | -0.5  |
| D2   | -1    |
| C1   | -2    |
| D1   | -3    |

HEAD CLAMPING APPARATUS FOR MAGNETIC DISK TESTER AND MAGNETIC DISK TESTER

BACKGROUND OF THE INVENTION

1. Field of the Invention

The present invention relates to a head clamping apparatus for a magnetic disk tester that tests the electromagnetic transducing characteristics of a magnetic disk and magnetic head that are essential parts of a hard disk drive. In particular, the present invention relates to a head clamping apparatus for positioning a magnetic head onto a target track on a magnetic disk and measuring the write/read characteristics of the magnetic head, and to a magnetic disk tester provided with a head clamping function.

2. Description of the Related Art

The performance of hard disk drives is improving, and to cope with it, the performance of testers for testing the electromagnetic transducing characteristics of magnetic disks and magnetic heads used for the hard disk drives must be improved.

To deal with increasing track densities in the hard disk drives, magnetic heads must have narrow cores. To correctly measure the characteristics of the magnetic heads with narrow cores, a tester capable of accurately positioning a magnetic head onto a target track on a magnetic disk is needed. Improving the positioning accuracy of a magnetic head is usually achieved by combining a coarse stage driven by a pulse motor or an ultrasonic motor with a micromotion stage driven by a piezo-element.

FIGS. 1 to 3 show a magnetic disk tester 101 according to a related art. The tester 101 has a drive controller (not shown) and a flat base 103. On the base 103, a spindle motor housing 107 incorporates a spindle motor 105. The spindle motor 105 drives a disk clamp 109 arranged on the housing 107. A top end of the disk clamp 109 clamps and unclamps a magnetic disk 111.

On the base 103, a coarse stage (X-stage) 117 is arranged adjacent to the disk clamp 109, to move magnetic heads 113 and 115 along an X-axis that is horizontal in FIG. 1. The coarse stage 117 is driven by an ultrasonic motor 119 along a ball screw (not shown) that extends along the X-axis.

On the coarse stage 117, a segment gear 121 is flatly fixed in parallel with the magnetic disk 111. The segment gear 121 has a semicircular periphery where a rack 123 is formed. A head loader 127 has a pinion (not shown) that meshes with the rack 123 and is driven by a motor (not shown).

The down-face and up-face magnetic heads 113 and 115 are attached to a head clamp 125 installed on the head loader 127. The head loader 127 is movable along a semiarc path on the segment gear 121. In FIG. 1, the magnetic heads 113 and 115 and the rotation center of the magnetic disk 111 are on the same line extending along the X-axis.

Referring to FIGS. 2 and 3, the head loader 127 has a base where a piezo-actuator 129 is arranged to minutely move the head loader 127 along the X-axis. The head clamp 125 has an upper clamp 131 and a lower clamp 133. The upper clamp 131 is removably attached to an upper fitting base 135 that is vertically movable. The lower clamp 133 is removably attached to a lower fitting base 137 that is vertically movable. A front end of the upper clamp 131 has a clamping part 139 to clamp a suspension 141. A front end of the suspension 141 holds the magnetic head 113. A front end of the lower clamp 133 has a clamping part 143 to clamp a suspension 145. A front end of the suspension 145 holds the magnetic head 115. The suspensions 141 and 145 are connected to leads 147, respectively.

The head loader 127 incorporates a driver to separately move the upper and lower clamps 131 and 133 in vertical directions. Namely, the magnetic heads 113 and 115 are moved toward and away from the magnetic disk 111 from above and below the magnetic disk 111.

To test the characteristics of the magnetic heads 113 and 115 with the tester 101, the magnetic disk 111 is rotated by the spindle motor 105 to a predetermined speed. The coarse stage 117 is moved along the X-axis across the tracks of the magnetic disk 111, to position the magnetic heads 113 and 115 onto a target location.

Referring to FIG. 4, an axis of the suspension 141 (145) passing through the magnetic head 113 (115) is provided with a skew (offset) angle with respect to a tangent of a track of the magnetic disk 111. The magnetic heads 113 and 115 each arranged at a front end of an HGA (head gimbal assembly) are vertically adjusted by the upper and lower clamps 131 and 133 of the head loader 127, so that the magnetic heads 113 and 115 may each be separated from the magnetic disk 111 by a predetermined flying height.

The magnetic heads 113 and 115 are minutely moved in a radius direction of the magnetic disk 111 crossing a track, to carry out a track profile test or an error rate test (bathtub characteristic test). During the test, the piezo-actuator 129 is activated to minutely shift the magnetic heads 113 and 115, to improve the positioning resolution of the magnetic heads 113 and 115.

A thermal drift causes an off-track error in the positions of the magnetic heads 113 and 115, and therefore, must be corrected. To achieve this, there is a tester provided with a closed-loop feedback system employing a servo burst signal. Such a feedback system is well-known in hard disk drive technology.

FIG. 5 shows a magnetic head/disk tester disclosed in Japanese Patent Laid Open Publication No. 2000-322850. This tester has a base 243 supporting a carriage (coarse stage) 230. The carriage 230 is guided on horizontal rails 236 and 238 in an X-axis direction as indicated with an arrow mark A.

The carriage 230 supports an outer ring 235 whose center is around an intersection of the X- and Y-axes of a horizontal coordinate system defined on the carriage 230. The outer ring 235 supports an inner ring 233. The inner ring 233 supports and moves a magnetic head support 232 that holds a magnetic head 234 to be tested. The carriage 230 is linearly driven by a step motor 239 along a guide screw 241 that extends along the X-axis. The guide screw 241 engages with an intermediate block 241A that is slidable on horizontal rails 241B and 241C extending along the X-axis. The carriage 230 is also driven by a piezo-actuator 237 along the X-axis with respect to the block 241A. Another step motor (not shown) is used to turn the inner ring 233, magnetic head support 232, and magnetic head 234 around an axis perpendicular to the surface of FIG. 5 relative to the outer ring 235 and carriage 230.

Linear encoders 240 and 242 are arranged on each side of the carriage 230. Each of the encoders 240 and 242 consists of a fixed part 240a (242a) attached to the base 243 and a movable part 240b (242b) attached to the outer ring 235. A present position of the magnetic head 234 is acquired from an arithmetic average of values read from the encoders 240 and 242.

The base 243 has a spindle 244 for rotating a magnetic disk 231 around a vertical axis. The spindle 244 has an optical encoder (not shown) to generate a series of sector pulses in response to angular positions of the magnetic disk 231.

FIG. 6 shows the details of a position controller 249 of the tester of FIG. 5. The operation of the position controller 249 will briefly be explained. To correct a thermal drift, servo burst patterns are written in a magnetic disk beforehand. A servo analyzer 245 detects the servo burst patterns and provides a corresponding signal. The linear encoders 240 and 242 provide signals indicating the position of the carriage 230. The signals from the servo analyzer 245 and linear encoders 240 and 242 are processed, and a result is sent to the piezo-actuator 237 to drive the carriage 230.

Namely, the related art employs the linear encoders 240 and 242 as a first information source and the servo burst patterns as a second information source uses them for a feedback loop.

Signals from the first information source, i.e., the linear encoders 240 and 242 indicate the position of the magnetic head 234 on the magnetic disk 231 and do not include a thermal drift. The moving range of the first information source is relatively wide to cover the whole area of the magnetic disk 231, and therefore, data from the first information source is used to move the magnetic head 234 from one position to another.

Signals from the second information source, i.e., the servo burst patterns recorded on the magnetic disk 231 indicate the position of the magnetic head 234 on the magnetic disk 231 and involve temperature conditions. The second information source covers a narrow area around a track on the magnetic disk 231, and therefore, data from the second information source is used to keep the magnetic head 234 at an instructed position.

SUMMARY OF THE INVENTION

However, according to the tester 101 of FIGS. 1 to 3, the magnetic heads 113 and 115 are mechanically fixed once they are positioned on a target track on the magnetic disk 111. As time passes, the magnetic heads 113 and 115 may shift from the target track, to deteriorate a read output or improperly erase written data. It is required to provide a device to keep the magnetic heads 113 and 115 on the target track. The piezo-electric actuator 129 of the tester 101 must drive a large mass including the head loader 127, and therefore, is unable to operate at high frequencies. As a result, the magnetic heads 113 and 115 are unable to quickly follow a target track.

As the density of tracks on a magnetic disk increases, the related art that corrects only an off-track error caused by a thermal drift will be insufficient to precisely control the magnetic heads. It is required to correctly control the positions of the magnetic heads on a magnetic disk on a sector-by-sector basis by eliminating the influence of disturbances such as airflows and vibrations.

According to the related art of FIG. 5, the carriage 230 supports the magnetic head 234 and the inner and outer rings 233 and 235, and therefore, is heavy. The piezo-actuator 237 must drive such a heavy carriage 230. Load on the piezo-actuator 237 is very large, and it is difficult to speedily and accurately drive the piezo-actuator 237, i.e., the magnetic head 234. It is difficult for the related art to accurately control the position of the magnetic head 234. In addition, the piezo-actuator 237 itself is relatively heavy and this deteriorates the responsiveness thereof.

The linear encoders 240 and 242 of the related art are spaced away from the magnetic head 234, and therefore, are easily affected by mechanical vibrations or disturbances when detecting the position of the magnetic head 230. Namely, the linear encoders 240 and 242 may be accurate to measure the position of the carriage 230, but not always be accurate and thus they are improper to precisely position the magnetic head 234.

A first object of the present invention is to provide a head clamping apparatus for a magnetic disk tester, capable of driving a piezo-electric actuator at high frequencies to easily and speedily make a magnetic head trace a target track.

In order to accomplish the object, a first aspect of the present invention provides a head clamping apparatus for a magnetic disk tester. The head clamping apparatus positions a magnetic head on a target track among concentric tracks formed on a magnetic disk that is revolving. The head clamping apparatus has a microactuator stage that supports the magnetic head and is driven by a microactuator in a track crossing direction. When energized, the microactuator minutely moves the microactuator stage in a horizontal direction in proportion to an input voltage to the microactuator. This results in minutely horizontally adjusting the magnetic head attached to the microactuator stage. The microactuator stage is small and a driving part thereof is light, to improve the rigidity of the microactuator stage as a whole. Consequently, the microactuator can drive the microactuator stage at high frequencies.

A second aspect of the present invention provides the microactuator stage of the first aspect with a base part to be attached to a head clamp, a stage part attached to a head attachment to which the magnetic head is attached, and two resilient pieces to connect the base part to the stage part, to thereby form a parallel plate spring structure. Between the two resilient pieces, a support part extends from the base part toward the stage part. Between the support part and one of the resilient pieces, the microactuator is arranged. When energized, the microactuator pushes and releases the resilient piece facing the support part. This deforms the two resilient pieces of the parallel plate spring structure of the microactuator stage. As a result, the stage part in front of the base part of the microactuator stage minutely moves in a horizontal direction. This minute stroke is enlarged by a mechanical ratio of a distance from the base part to the microactuator to a distance from the base part to the stage part.

A third aspect of the present invention provides the stage part of any one of the first and second aspects with a cut to divert an external force applied to the stage part into a compressing direction of the microactuator. The microactuator is structurally strong against a compressing force and is vulnerable to a tensile force, and therefore, may be broken if a tensile force is applied thereto due to an external force to the stage part. The cut on the stage part diverts such an external force on the stage part into the compressing direction of the microactuator, to effectively prevent the breakage of the microactuator.

A second object of the present invention is to provide a magnetic disk tester capable of directly sensing the position of a magnetic head as near to a core of the magnetic head as possible. The tester uses the position thus obtained for feedback control to precisely control the position of the magnetic head.

In order to accomplish the second object, a fourth aspect of the present invention provides a magnetic disk tester having a head clamp installed on a head load mechanism that is arranged on a coarse stage. A piezo-stage for holding a magnetic head assembly is attached to the head clamp. A reflective scale is attached to a back face of the piezo-stage. The reflective scale is formed by depositing light-shield stripes on a film at predetermined intervals. A laser head is attached to the coarse stage. The laser head has a light emission/reception part facing the light-shield stripes of the reflective scale. A positioning unit controls the position of the head clamp. The laser head emits a laser beam, which is reflected by the reflective scale. According to the reflected beam, the positioning unit detects the position of the magnetic head assembly on a magnetic disk. According to the detected position and a reference position, an error signal is generated, and based on the error signal, the position of the head clamp is precisely controlled.

A fifth aspect of the present invention provides the positioning unit of the fourth aspect with a precise positioning mode and a tracking mode. In the precise positioning mode, positional information concerning the coarse stage and positional information concerning the magnetic head assembly detected from a reflected beam from the reflective scale are used to control the magnetic head assembly. In the tracking mode, servo burst patterns written before the data on the magnetic disk are read to provide a servo burst signal, the amplitude of the servo burst signal is used to generate a position error signal, and the position error signal is used to control the position of the magnetic head assembly.

BRIEF DESCRIPTION OF THE DRAWINGS

FIGS. 14A to 14C are perspective views showing a head clamp of the magnetic disk tester of the second embodiment, in which FIG. 14A shows a microactuator, FIG. 14B shows a head clamping mechanism, and FIG. 14C shows an inverted view of FIG. 14B;

FIGS. 16A to 16C are explanatory views showing servo burst patterns according to the second embodiment, in which FIG. 16A shows examples of servo burst patterns, FIG. 16B shows detected amplitudes of the servo burst patterns, and FIG. 16C shows a position error signal;

DESCRIPTION OF THE PREFERRED EMBODIMENT

Head Clamping Apparatus for Disk Tester

First Embodiment

Figure 1:
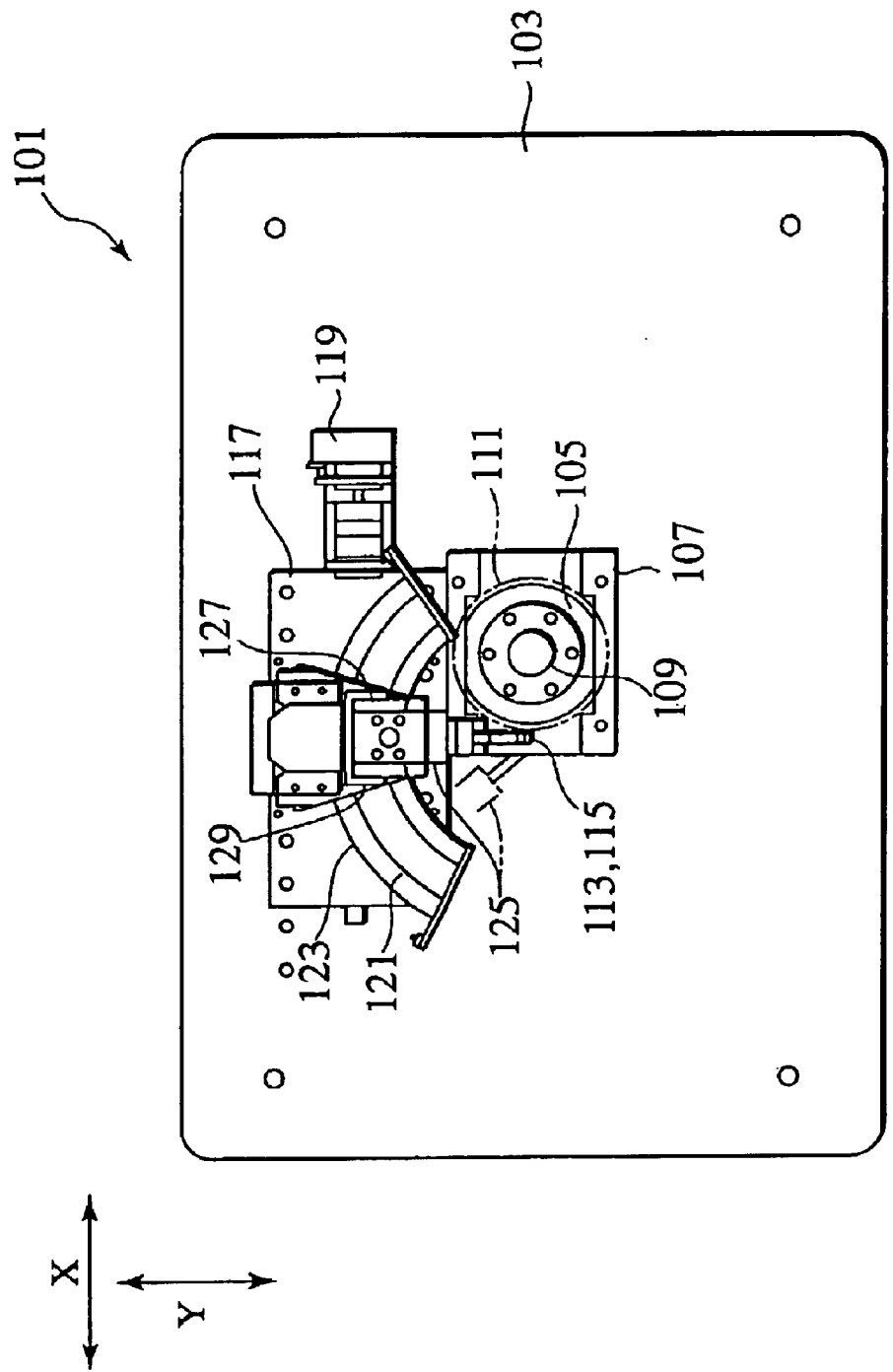
FIG. 1 is a plan view showing a magnetic disk tester according to a related art.
Figure 2:
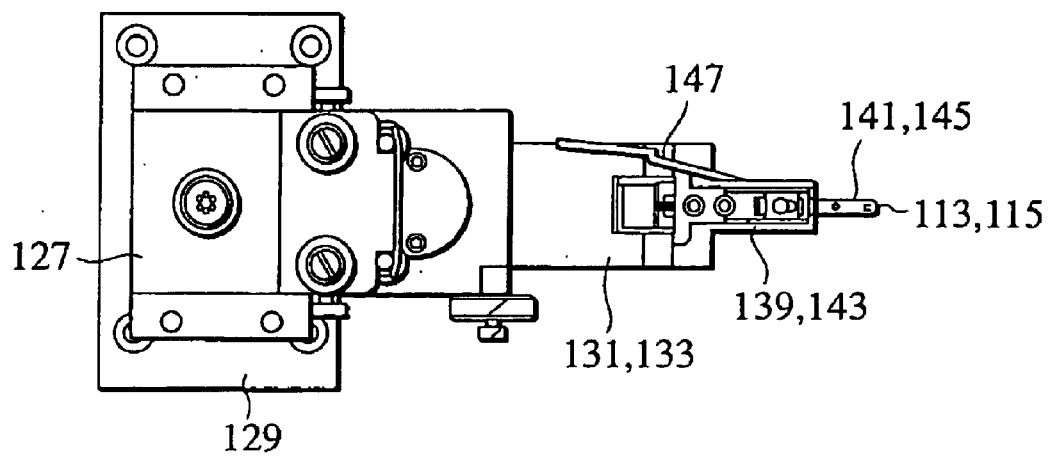
FIG. 2 is a plan view showing a head clamping apparatus for the magnetic disk tester of the related art.
Figure 3:
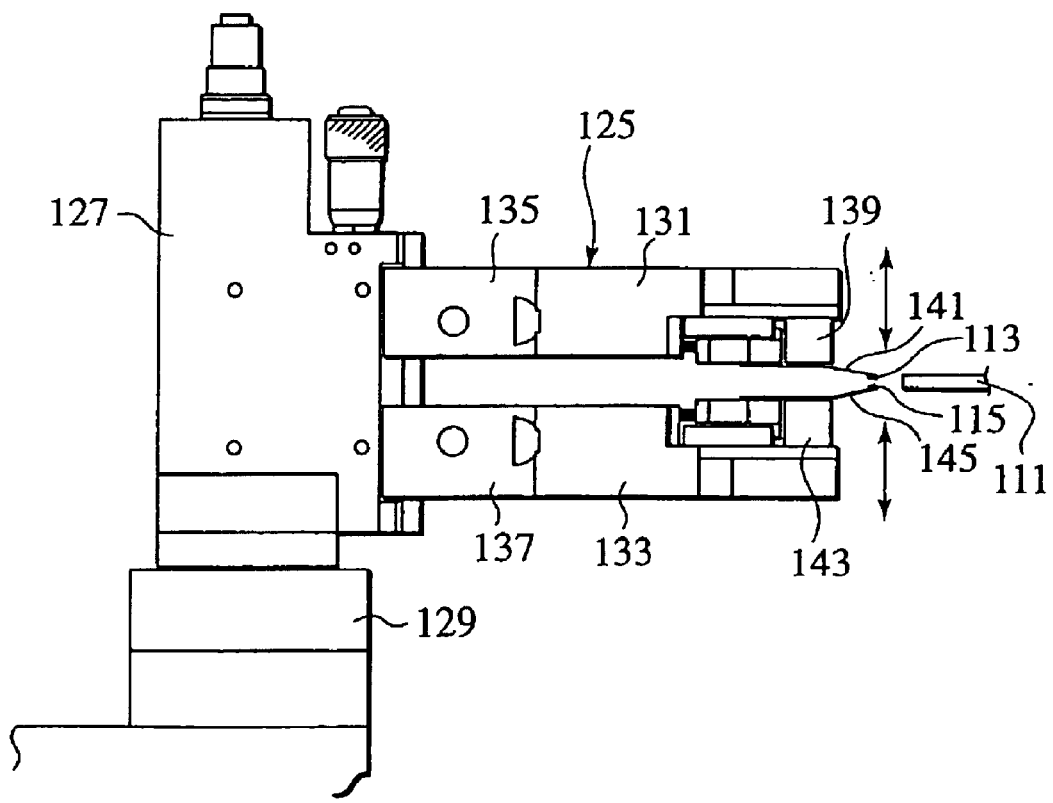
FIG. 3 is a side view showing the head clamping apparatus of FIG. 2.

A head clamping apparatus for a magnetic disk tester according to the first embodiment of the present invention will be explained. The head clamping apparatus of the first embodiment is widely applicable not only to the magnetic disk tester of the related art of FIG. 1 but also to other disk testers.

Figure 7:
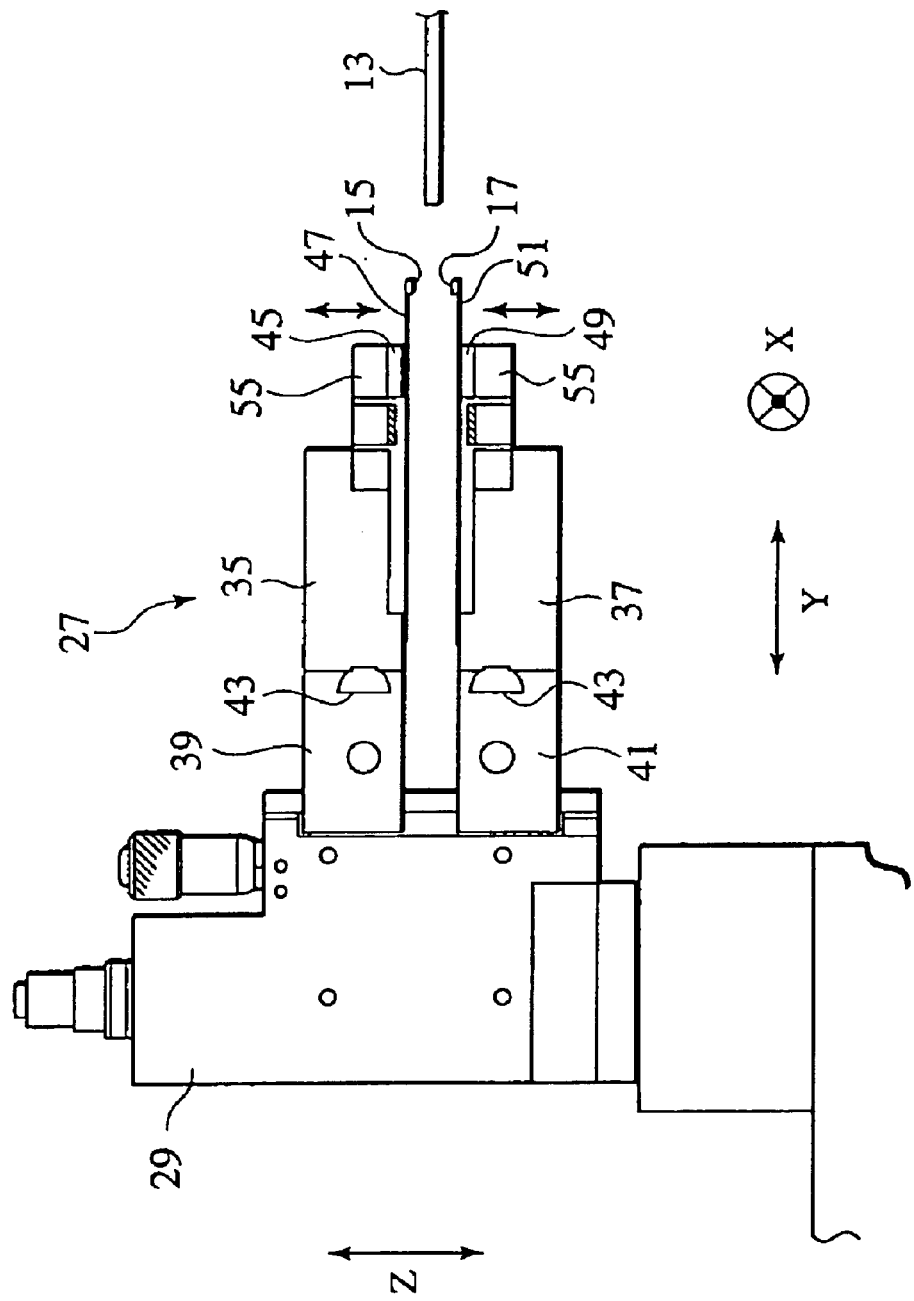
FIG. 7 is a side view showing a head clamping apparatus for a magnetic disk tester according to a first embodiment of the present invention.

FIG. 7 shows the head clamping apparatus 27 of the first embodiment installed on a head loader (not shown) of a magnetic disk tester. The apparatus 27 has a pair of down-face and up-face magnetic heads 15 and 17. Unlike the related arts, a base of the head loader is not provided with a microactuator having a piezo-element. The present invention is characterized by installing the microactuator on another structural part.

The head clamping apparatus 27 has an upper head clamp 35 and a lower head clamp 37. The upper head clamp 35 is attached to an upper fitting base 39 that is vertically movable along a Z-axis. The lower head clamp 37 is attached to a lower fitting base 41 that is vertically movable along the Z-axis. The upper head clamp 35 is removably attached to the base 39 through a dovetail groove 43. The lower head clamp 37 is removably attached to the base 41 through the dovetail groove 43.

A front end of the upper head clamp 35 has a head attachment 45 to which a suspension 47 is attached. The suspension 47 has a front end to hold the down-face magnetic head 15. A front end of the lower head clamp 37 has a head attachment 49 to which a suspension 51 is attached. The suspension 51 has a front end to hold the up-face magnetic head 17. Each of the suspensions 47 and 51 is connected to a lead 53 as shown in FIG. 8.

The head loader incorporates a driver to vertically and separately drive the upper and lower head clamps 35 and 37. As a result, the magnetic heads 15 and 17 are speedily moved toward and away from a magnetic disk 13 from above and below the magnetic disk 13.

The head clamping apparatus 27 according to the first embodiment will be explained in detail. The upper and lower head clamps 35 and 37 are structured substantially symmetrically. Accordingly, the upper head clamp 35 will be explained in detail, and the explanation of the lower head clamp 37 will be omitted.

Figure 8:
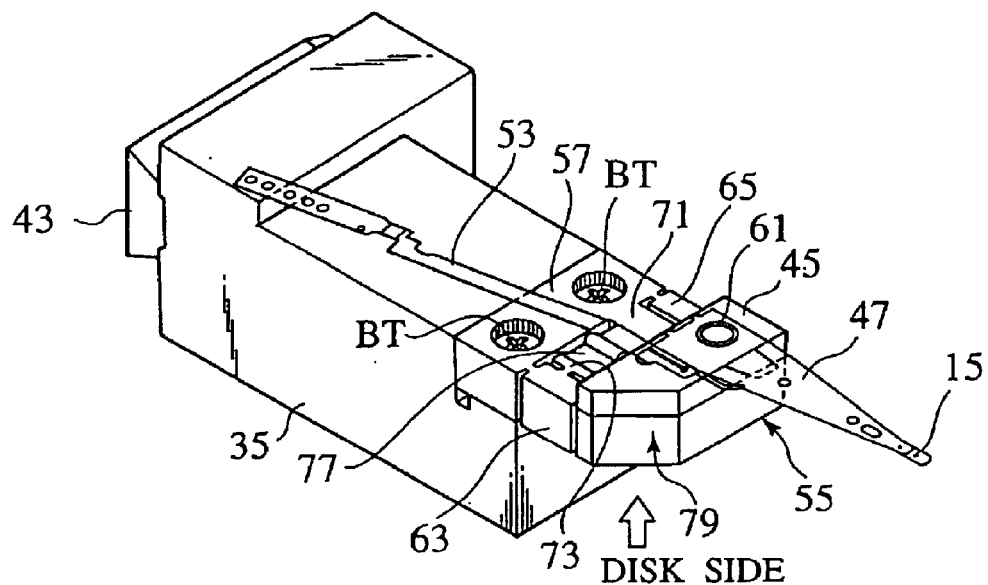
FIG. 8 is a perspective view showing the bottom of an upper head clamp according to the first embodiment.

FIG. 8 is an inverted perspective view showing the upper head clamp 35. At a front end of the upper head clamp 35, a base 57 of a piezo-stage (micro stage) 55 is attached with bolts BT. A front end of the piezo-stage 55 is a stage 59 to which the head attachment 45 is attached. To the head attachment 45, the suspension 47 is attached with a screw 61 through a plate spring (not shown). A front end of the suspension 47 has the down-face magnetic head 15.

Figure 9:
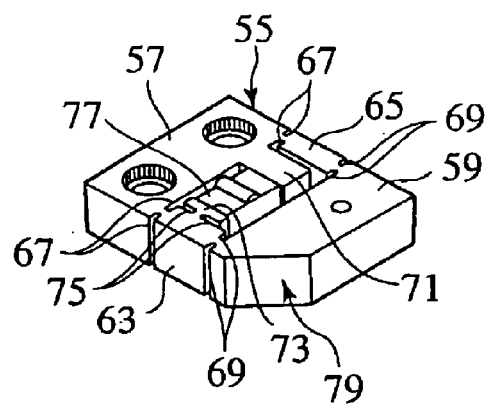
FIG. 9 is a perspective view showing the details of a piezo-stage of the head clamp of FIG. 8.
Figure 10:
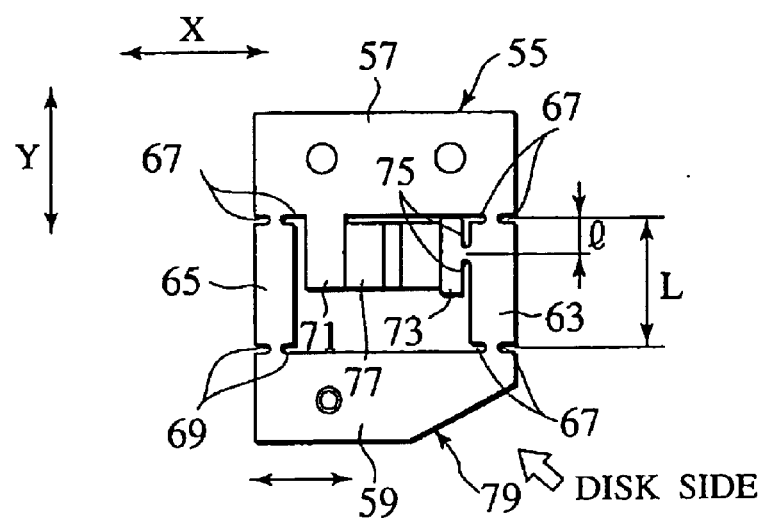
FIG. 10 is a plan view showing the piezo-stage of FIG. 9.

Referring to FIGS. 9 and 10, the base 57 and stage 59 of the piezo-stage 55 are connected to each other into one body through two resilient pieces 63 and 65 to form a parallel plate spring mechanism. Each of the resilient pieces 63 and 65 has constrictions 67 and 69 on the base and stage sides, respectively. FIG. 10 is a plan view showing the piezo-stage 55 with the upper head clamp 35 of FIG. 7 seen from above, i.e., the upper head clamp 35 of FIG. 9 seen from below.

At the right side of a space shown in FIG. 9 between the resilient pieces 63 and 65, a support 71 protrudes from the base 57. The resilient piece 63 on the left side of the space has a receiver 73 opposing the support 71 to receive the microactuator (piezo-element) 77. Between the receiver 73 and the resilient piece 63, a constriction 75 is formed to provide the receiver 73 with flexibility. The microactuator 77 is arranged between the support 71 and the receiver 73.

The piezo-stage 55 is made from, for example, conductive ceramics or metal by precision processing such as wire electric discharge machining. Among the ceramics, Saialon is excellent in high-temperature strength, molten metal corrosion resistance, abrasion resistance, etc. Saialon is difficult to process, and therefore, near-net shaping and sintering are needed to process the same. Conductive Saialon HCN-40 is precisely processible by wire electric discharge machining.

The conductive Saialon HCN-40 has a low electric resistivity of $7 \times 10^{-40}$ Ω·cm, and therefore, is processible by electric discharge machining more speedily than hard metal or steel. The discharge-machined surface of the conductive Saialon HCN-40 has a roughness of 5 to 15 $\mu$m that is substantially equal to that of hard metal or steel. The mechanical properties of the conductive Saialon HCN-40 under normal and high temperatures are substantially equal to those of other types of Saialon.

Figure 4:
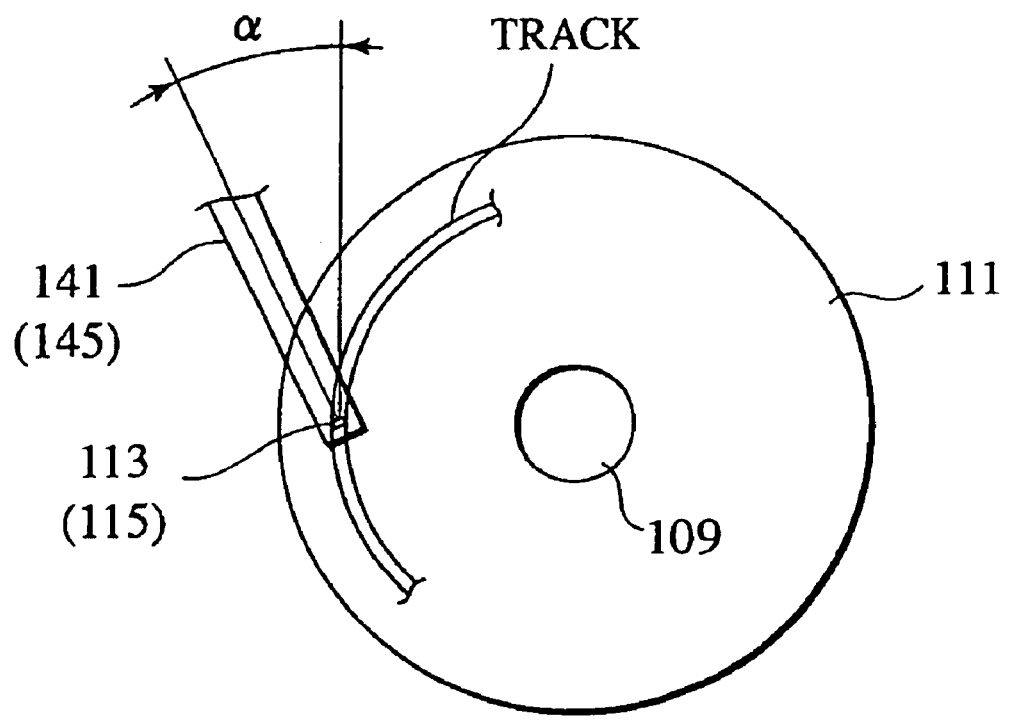
FIG. 4 is an explanatory view showing a skew angle of a magnetic head assembly with respect to a track on a magnetic disk.
Figure 5:
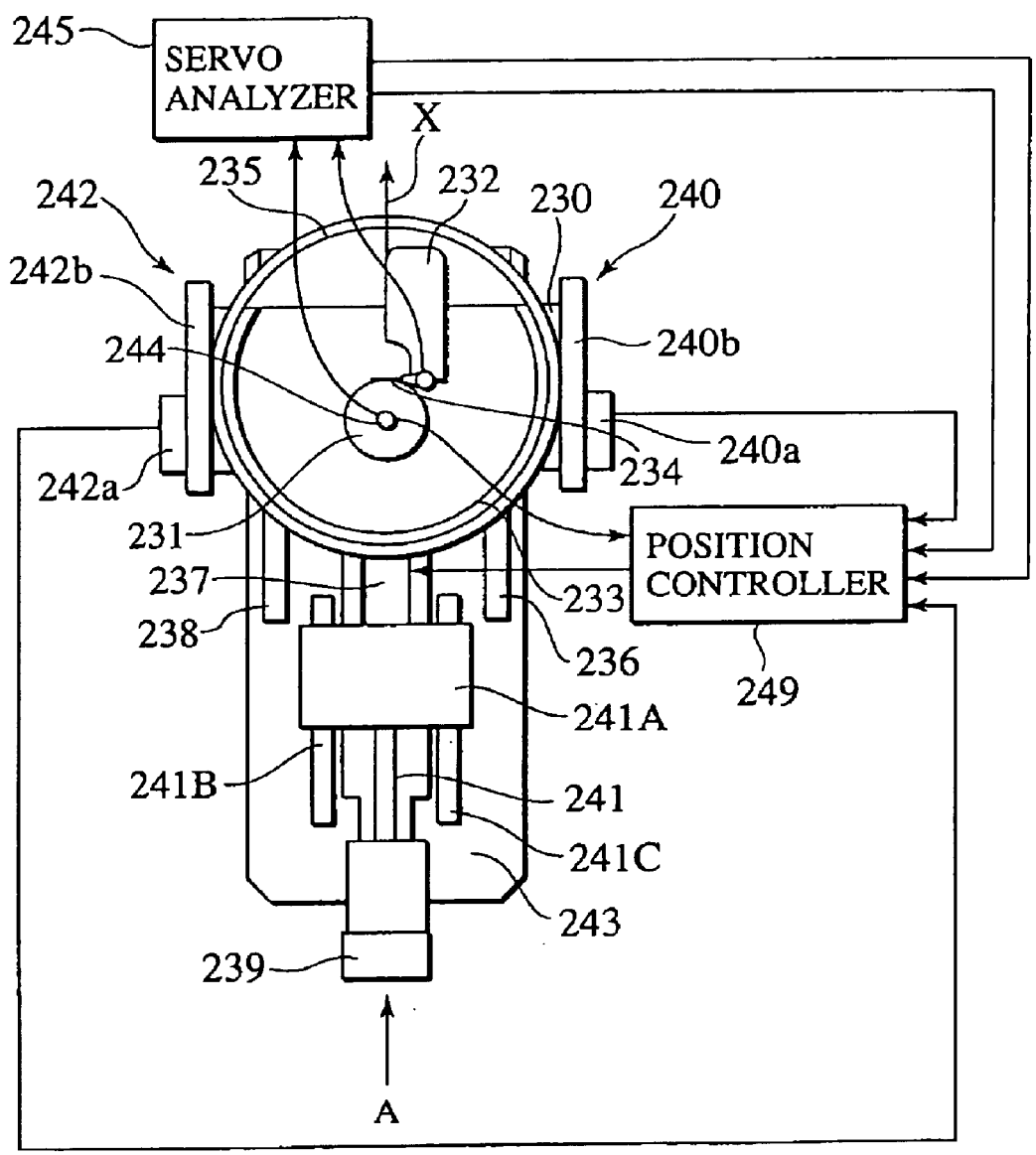
FIG. 5 is a schematic view showing a magnetic disk tester according to a related art.
Figure 6:
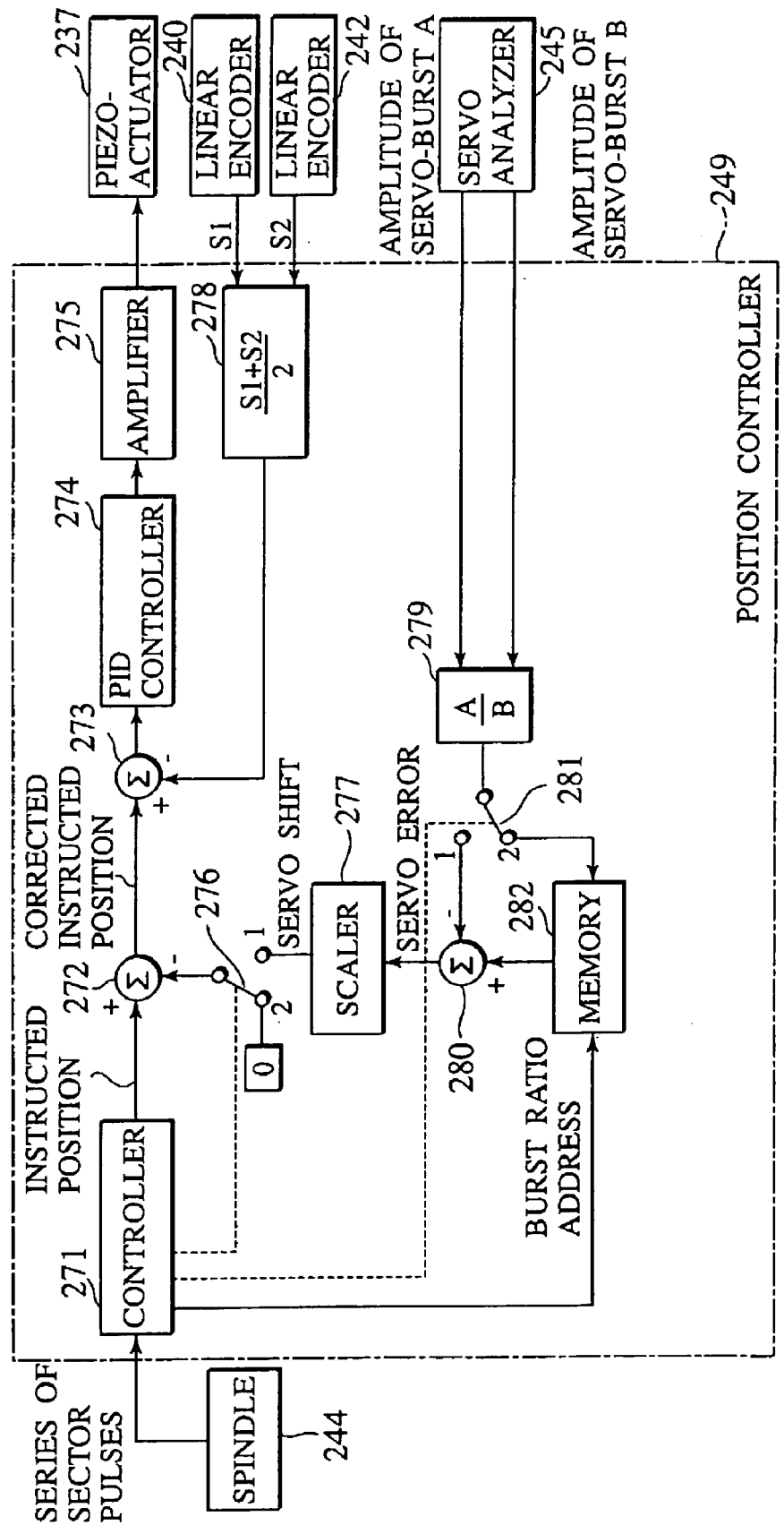
FIG. 6 is a block diagram showing servo control in the magnetic disk tester of FIG. 5.

To test the characteristics of the magnetic heads 15 and 17, the magnetic disk 13 is rotated by a spindle motor (not shown) to a predetermined speed. The coarse stage is moved along the X-axis across tracks on the magnetic disk 13, to position the cores of the magnetic heads 15 and 17 onto a target position. An offset angle, i.e., a skew angle (FIG. 4) is set with respect to a tangent of a track. The upper and lower head clamps 35 and 37 are vertically adjusted by the head loader, so that the magnetic heads 15 and 17 attached to the head clamps 35 and 37 may each have a predetermined flying height from the magnetic disk 13.

The positions of the magnetic heads 15 and 17 are minutely moved in a track width direction around the target track to carry out a track profile test or an error rate test (bathtub characteristic test). At this time, the piezo-stages 55 on the upper and lower head clamps 35 and 37 move the magnetic heads 15 and 17 by a minute offset, to improve the positioning resolution of the magnetic heads 15 and 17. Unlike the related arts, the present invention is capable of driving the piezo-actuator 77 at high frequencies because the piezo-stage 55 and driving parts are small and light to improve the rigidity of the piezo-stage 55 as a whole.

The piezo-actuator 77 on the piezo-stage 55 expands and contracts in proportion to an input voltage, to push and release the receiver 73 and deform the resilient pieces 63 and 65 in the parallel plate spring structure of the piezo-stage 55. As a result, the stage 59, which is distanced from the constriction 67 on the base side by distance of L, is minutely moved along the X-axis as indicated with an arrow mark in FIG. 10. This movement (stroke) of the stage 59 is enlarged by a mechanical ratio of L/l, where l is a distance from the Y-axis center of the piezo-actuator 77, i.e., the constriction 75 of the receiver 73 to the constriction 67. At the same time, a moving speed is amplified to realize a high-speed response.

As a result, the down-face magnetic head 15 (in the case of FIG. 8) is minutely moved along the X-axis. This is because, on the upper head clamp 35, the magnetic head 15 is attached to the front end of the suspension 47 that is attached to the stage 59 of the piezo-stage 55 through the head attachment 45.

The piezo-actuator 77 is structurally strong against a compression force and vulnerable to a tensile force. If a tensile force is applied to the piezo-actuator 77 due to the stage 59 hitting something, the piezo-actuator 77 will be broken. To avoid this, the shape of a part of the stage 59 that may hit something is cut. Namely, a right part of the stage 59 facing the magnetic disk 13 is shaped to have a cut 79 as shown in FIGS. 9 and 10 so that a hitting force acting on the stage 59 may be diverted into a compressing direction of the piezo-actuator 77. Even if the piezo-stage 55 hits another device, the piezo-actuator 77 will not be broken.

The present invention is not limited to the embodiment mentioned above. Proper modifications are possible on the present invention. Although the microactuator employed by the embodiment is a piezo-actuator, it may be a micromotor or a rotary microactuator.

In this way, the microactuator stage and driving parts of the head clamping apparatus according to the embodiment are small and light to improve the rigidity of the microactuator stage as a whole. As a result, the microactuator of the embodiment can operate at high frequencies. A stroke of the stage 59 according to the embodiment is enlarged at a mechanical ratio of the distance from the base 57 of the piezo-stage 55 to the microactuator 77 to the distance from the base 57 of the piezo-stage 55 to the stage 59. In addition, the cut 79 of the piezo-stage 55 prevents the breakage of the microactuator 77.

Magnetic Disk Tester with Magnetic Head Position Detecting Function

A magnetic disk tester according to the present invention rotates a magnetic disk having concentric tracks and tests the electromagnetic transducing characteristics of the magnetic disk or a magnetic head. The tester has a head clamp to position the magnetic head onto a target track on the magnetic disk. The head clamp is removably attached to a head load mechanism, which is installed on a coarse stage set on a base. An actuator such as a piezo-element and a piezo-stage are removably attached to the head clamp. The piezo-stage has a parallel plate spring structure to hold the actuator and enlarge a displacement of the actuator as described in the first embodiment.

A face of the piezo-stage facing the surface of the magnetic disk is provided with a magnetic head assembly (HGA (head gimbal assembly)) including the magnetic head. A face of the piezo-stage opposite to the magnetic disk is provided with a reflective scale made of a thin film. A laser head is fixed to the coarse stage to face the reflective scale. The laser head emits a laser beam toward the reflective scale and detects a reflected beam from the reflective scale.

This tester has a precise positioning mode and a tracking mode, to position the magnetic head assembly. In the precise positioning mode, a drive voltage to the piezo-element is determined according to information provided by a reflected beam from the reflective scale. In the tracking mode, the magnetic head reads servo burst patterns written before the data on the magnetic disk and provides a servo burst signal. A drive voltage to the piezo-element is determined based on a position error signal which is prepared according to the amplitude of the servo burst signal.

A magnetic disk tester having a head position detecting function according to the second embodiment of the present invention will be explained.

Second Embodiment

Figure 11:
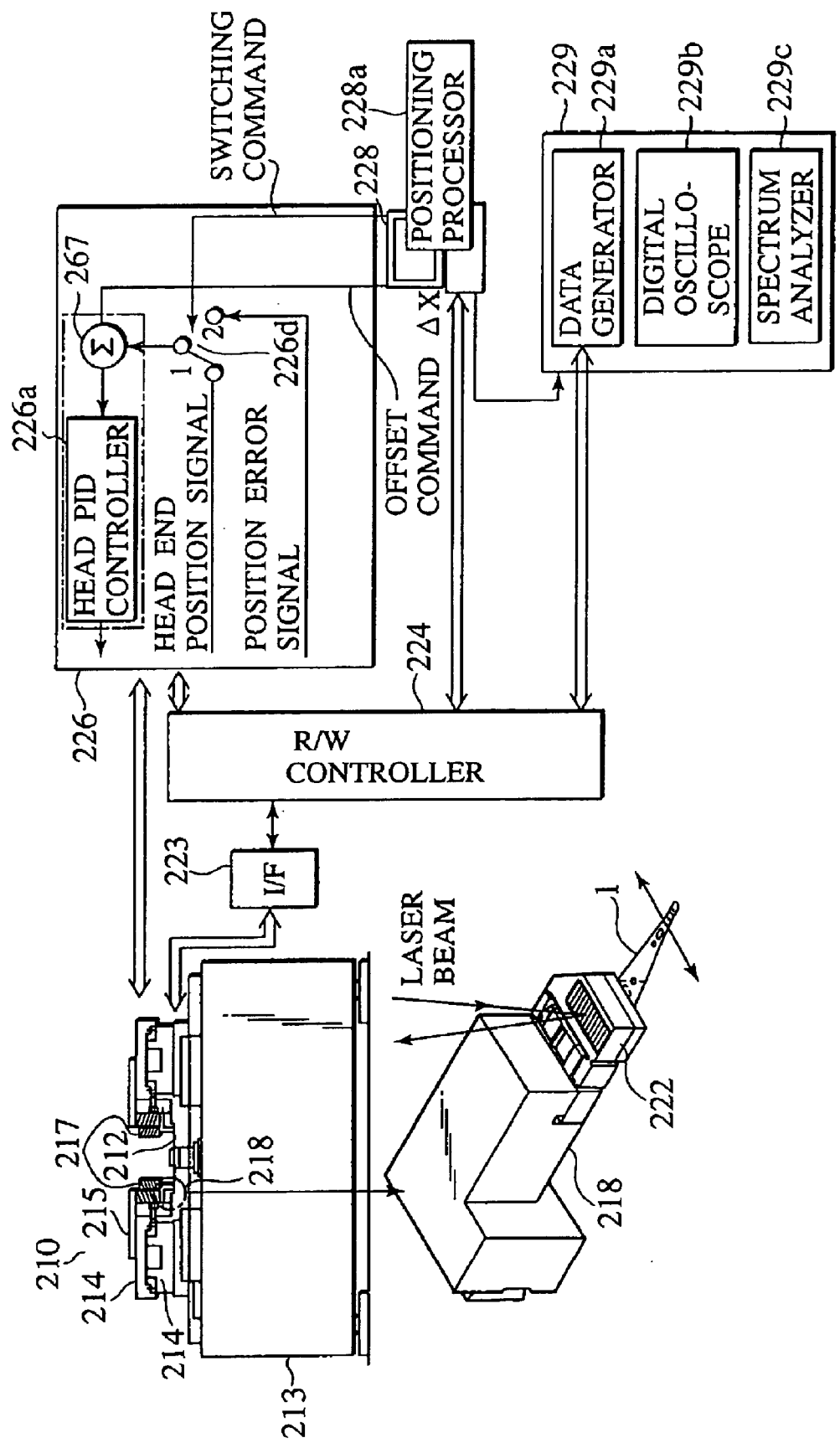
FIG. 11 is a schematic view showing a magnetic disk tester according to a second embodiment of the present invention.
Figure 12:
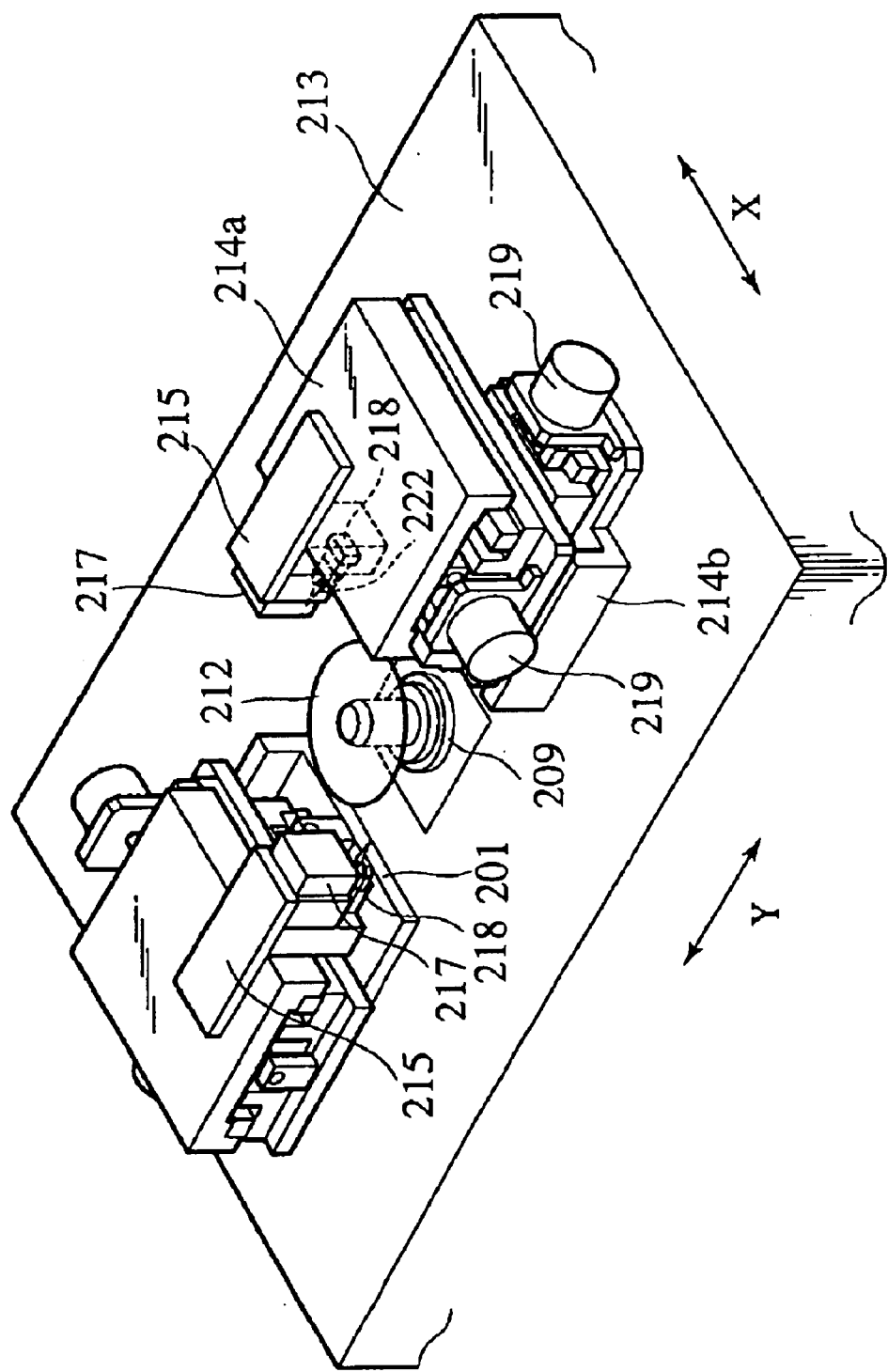
FIG. 12 is a perspective view showing the magnetic disk tester of FIG. 11.

FIG. 11 schematically shows the magnetic disk tester according to the second embodiment. FIG. 12 is a perspective view showing the tester. The tester includes the tester proper, an electric circuit, a computer, and a measuring unit.

The tester 210 has a two-dimensional coarse stage 214 consisting of an X-axis stage 214a that is movable along a X-axis and a Y-axis stage 214b that is movable along a Y-axis. Two coarse stages 214 are symmetrically arranged about a magnetic disk 212 that is driven by a spindle 209.

On the coarse stage 214, a head mechanism (head load mechanism) 215 is connected. The head mechanism 215 has a laser head 217 and a head clamp 218. The tester 210 also has a coarse stage glass scale to detect the position of the coarse stage 214 and coarse stage motors 219 to drive the coarse stage 214.

The head clamp 218 supports a magnetic head assembly (HGA (head gimbal assembly)) 201 to write and read information to and from the magnetic disk 212. In the vicinity of the magnetic head assembly 201, a read/write amplifier (not shown) is arranged to amplify a signal from the magnetic head assembly 201 and supply a write current to the magnetic head assembly 201.

The head clamp 218 has a piezo-stage 273 that supports a head attachment 220. The piezo-stage 273 has a reflective scale 222 as shown in FIG. 14C. The head clamp 218 with the reflective scale 222 will be explained in detail later.

In FIG. 11, the electric circuit includes an interface 223 for an electric system of the tester 210, a read/write controller 224, a servo controller 226, etc. The servo controller 226 includes at least a head PID controller 226a and a switch 226d. A reflected beam from the reflective scale 222 is used to generate a head position signal and a position error signal, and one of these signals is selected by the switch 226d. A difference between the selected signal and a target offset signal is used to control the head clamp 218. The controller 226a is not limited to the one carrying out PID control. To control the head clamp 218 according to an error signal, the controller 226a may achieve any type of control such as predictive control using predetermined models.

The head PID controller 226a generates a coarse stage control signal according to a target position provided by the computer 228 and the present position of the coarse stage 214 and supplies the control signal to the motors of the coarse stage 214.

The tester 210 of the second embodiment employs a precise positioning mode and a tracking mode for controlling the magnetic head assembly 201. In the tracking mode, the magnetic head assembly 201 reads servo burst patterns written before the data on the magnetic disk 212 and provides a servo burst signal. The position of the magnetic head assembly 201 is determined according to a position error signal which is generated based on the amplitude of the servo burst signal. The switch 226d is used to select one of the precise positioning mode and tracking mode.

Figure 13:
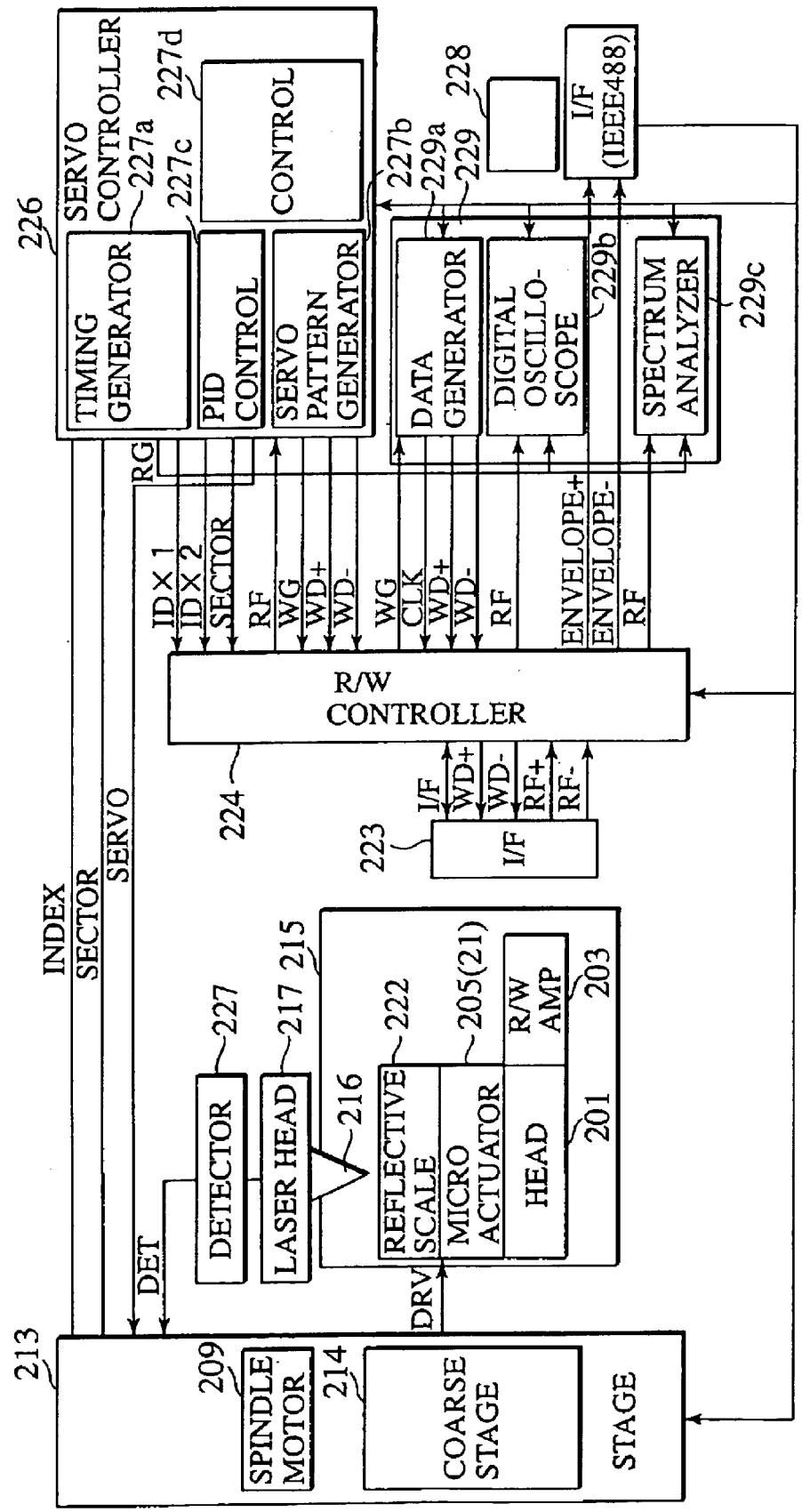
FIG. 13 is a block diagram showing the magnetic disk tester of FIG. 11.

FIG. 13 shows a typical structure of the tester according to the second embodiment. The head mechanism 215 has the magnetic head assembly 201 to write and read data to and from the magnetic disk 212, a read/write amplifier 203 to amplify a signal from the magnetic head assembly 201 and supply a write current to the magnetic head assembly 201, the microactuator 205 fixed to the head clamp 218, to move the magnetic head assembly 201, and the reflective scale 222 attached to the piezo-stage 273 at a front end of the microactuator 205.

The laser head 217 and a detector 227 are disposed above the reflective scale 222. The laser head 217 emits a laser beam 216 toward the reflective scale 222 and receives a reflected beam from the reflective scale 222. The detector 227 receives the output of the laser head 217 and a grating signal from the reflective scale 222, interpolates and divides the received signals, and provides a head position signal DET of high resolution.

The servo controller 226 carries out servo positioning control for the microactuator 205. A timing generator 227a receives signals INDEX and SECTOR from the spindle motor 209 and generates a gate signal required to write or read servo patterns. A servo pattern generator 227b writes servo patterns. A PID controller 227c detects the amplitude of a read servo signal, processes the detected amplitude, and generates a position error signal. A controller 227d controls communication with the computer 228. The measuring unit 229 has a data generator 229a to generate data to write, a digital oscilloscope 229b to measure parameters related to a read signal, and a spectrum analyzer 229c to carry out a spectrum analysis such as an S/N ratio analysis.

Figure 14A:
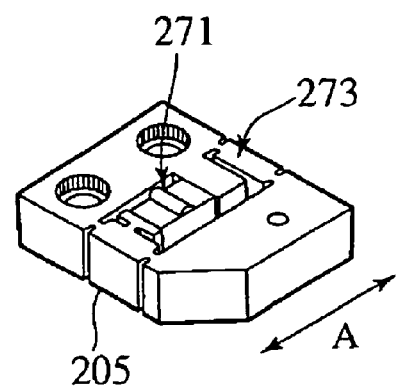
Figure 14B:
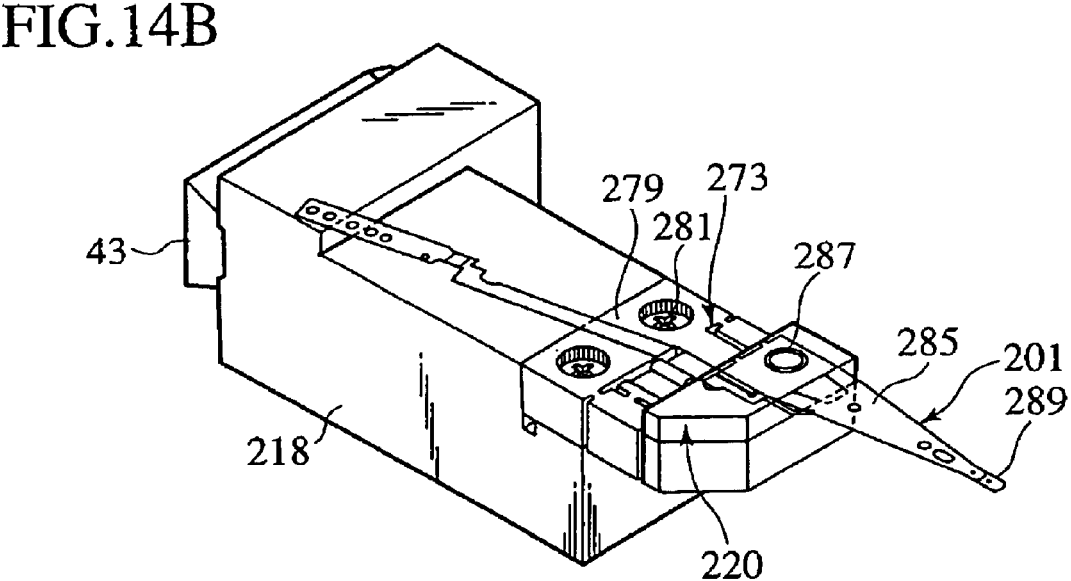
Figure 14C:
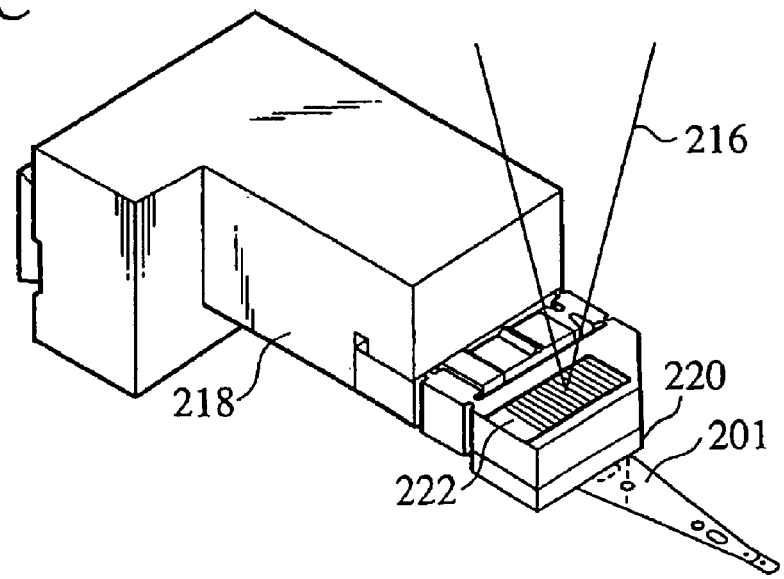

FIGS. 14A to 14C are perspective views showing the head clamp 218 according to the second embodiment. In FIG. 14A, the microactuator 205 has the piezo-element 271 and the piezo-stage 273 that holds the piezo-element 271. The piezo-stage 273 has a parallel plate spring structure to enlarge a displacement of the piezo-element.

FIGS. 14B and 14C show an example of a head clamping mechanism to attach the magnetic head assembly 201 to the head load mechanism. In FIG. 14B, a base 279 of the piezo-stage 273 is attached to a front end of the head clamp 218 with bolts 281. A front end of the piezo-stage 273 holds the head attachment 220.

To the head attachment 220, the magnetic head assembly 201 is removably attached. The magnetic head assembly 201 includes a suspension 285 and a magnetic head core 289 attached to a front end of the suspension 285. In FIG. 14B, the suspension 285 is attached to the head attachment 220 with a screw 287 through a plate spring (not shown). If the data write/read performance of the magnetic head assembly 201 deteriorates, the magnetic head assembly 201 may be replaced with a new one at low cost without replacing the microactuator 205 on which the reflective scale 222 is formed. FIG. 14C is an inverted view of FIG. 14B. The reflective scale 222 is formed on the piezo-stage 273 opposite to the magnetic head assembly 201.

The magnetic head assembly 201 is moved in parallel with the magnetic disk 212, and the laser head 217 fixed to the coarse stage 214 emits a laser beam toward the reflective scale 222. A reflected beam from the reflective scale 222 is received by the laser head 217. The reflective scale 222 is made of a polycarbonate substrate on which metal thin film stripes are formed at the intervals of about 1 $\mu$m.

Figure 15:
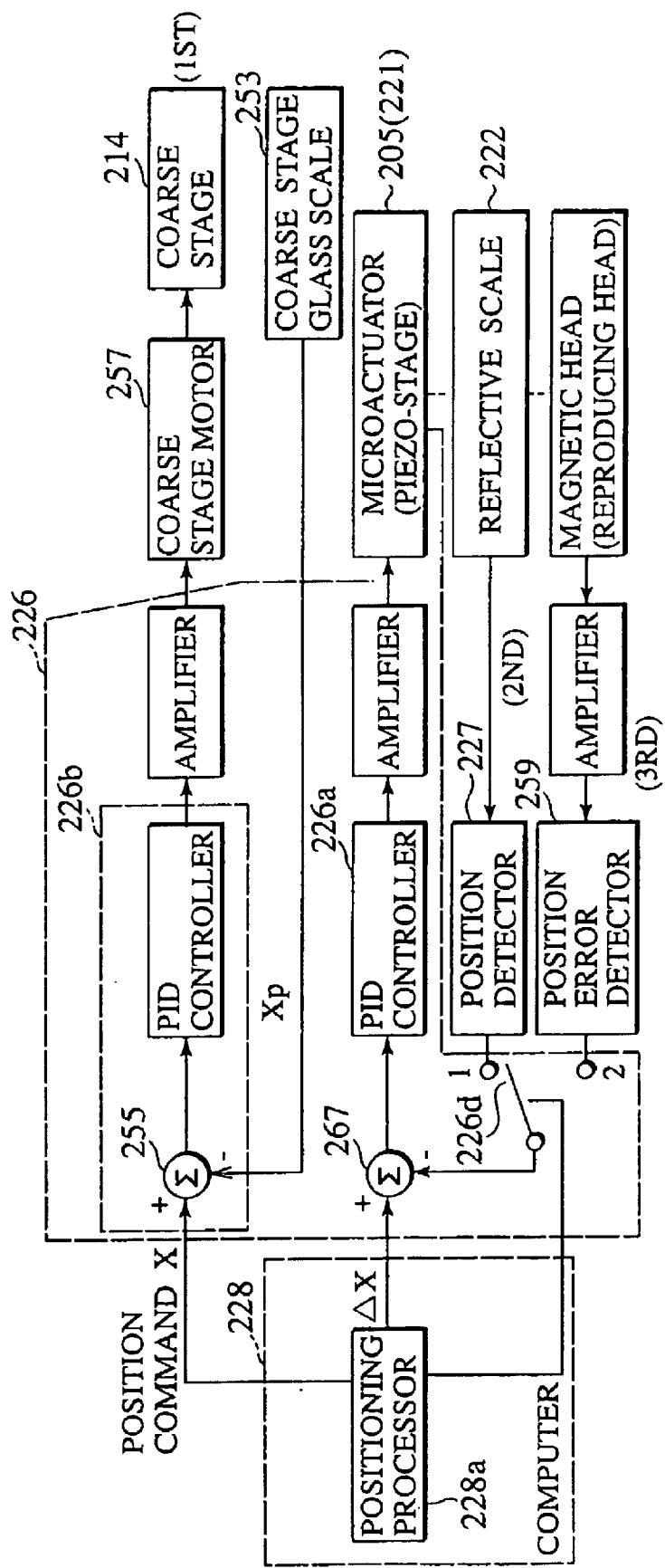
FIG. 15 is a block diagram showing a servo control system according to the second embodiment.

FIG. 15 is a block diagram explaining servo control carried out by the magnetic disk tester according to the second embodiment. The laser head 217 emits a laser beam which is reflected by the reflective scale 222 and the reflected beam is received by the laser head 217. A signal corresponding to the received reflected beam is detected by the detector 227 which provides a high-resolution signal indicating the position of the head attachment 220 relative to the magnetic disk 212.

The computer 228 sends a position command X to position the head core of the magnetic head assembly 201 onto a target track. According to the present invention, the positioning of the magnetic head assembly 201 is carried out by the coarse stage 214 and microactuator 205. The coarse stage 214 covers a relatively wide range from an innermost track to an outermost track on the magnetic disk. The microactuator 205 covers a relatively narrow range of plus and minus several tracks around a target track.

The positioning control system according to the present invention incorporates three feedback loops and operates in the two modes, i.e., the precise positioning mode and tracking mode. In FIG. 15, the first feedback loop is a loop to control the coarse stage 214. The second and third feedback loops are those to control the microactuator 205. The second and third feedback loops are switched from one to another through the switch 226d. In the precise positioning mode, the magnetic head assembly 201 is positioned through the first and second feedback loops with the use of the coarse stage 214 and microactuator 205. In the tracking mode, the first and third feedback loops are used. In particular, the third feedback loop is mainly used by detecting the amplitude of a servo burst signal read by the magnetic head assembly 201. Each of the modes will be explained in detail.

Precise Positioning Mode

In the precise positioning mode, a positioning processor 228a in the computer 228 provides a position command X for the coarse stage 214. The coarse stage 214 has the glass scale 253 to detect a present position Xp of the coarse stage 214. The glass scale 253 consists of a movable part arranged on the coarse stage 214 and a fixed part arranged on the base, to provide the present position Xp of the coarse stage 214.

A first adder 255 compares the position command X with the present position Xp and provides an error signal to a PID controller 226b. The PID controller 226b carries out PID control to minimize the error signal and sends a control signal to a coarse stage motor 257, which drives the coarse stage 214 accordingly. If the difference between the position command X and the present position Xp is within a predetermined value, for example as 20 nm, it is determines that the coarse stage 214 has correctly been positioned.

During the positioning of the coarse stage 214, the switch 226d is connected to a contact 1. At this time, the computer 228 sends an offset command $\Delta X=0$ for the microactuator 205 to a second adder 267. As a result, the microactuator 205 is PID-controlled to keep a center position in the movable range.

The completion of the positioning of the coarse stage 214 is the completion of the positioning of the magnetic head assembly 201. The actual position of the magnetic head assembly 201 is detected according to information from the reflective scale 222, and precise position control is carried out to equalize the detected position with the position command.

After the completion of the positioning of the magnetic head assembly 201, a track profile may be measured at high speed. To achieve this, a variable range for the offset command $\Delta X$ to the microactuator (piezo-stage) 205 is specified, and the TAA (track average amplitude) of a read output is measured on each $\Delta X$.

Tracking Mode

In the tracking mode, the switch 226d is connected to a contact 2. A drive voltage to the microactuator 205 is determined by the third feedback loop according to the amplitude of a servo burst signal read by the magnetic head assembly 201.

Figure 16A:
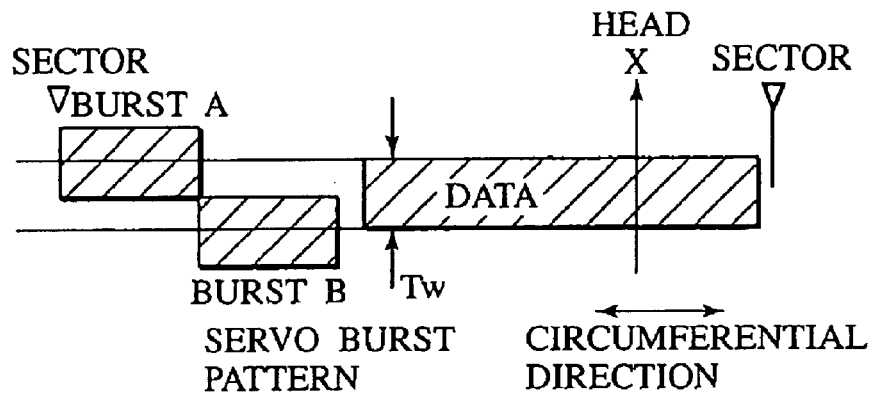
Figure 16B:
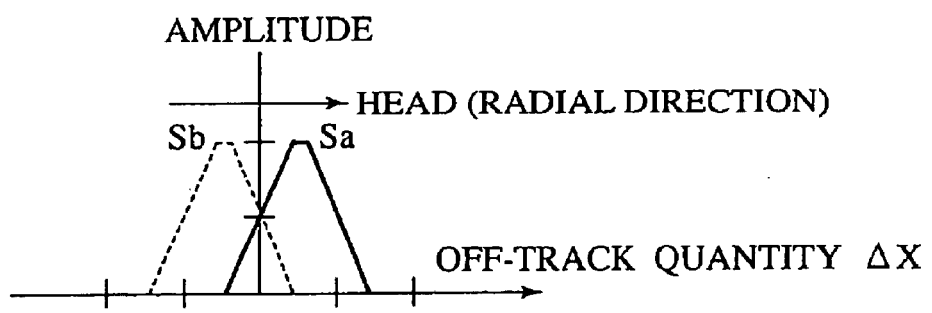
Figure 16C:
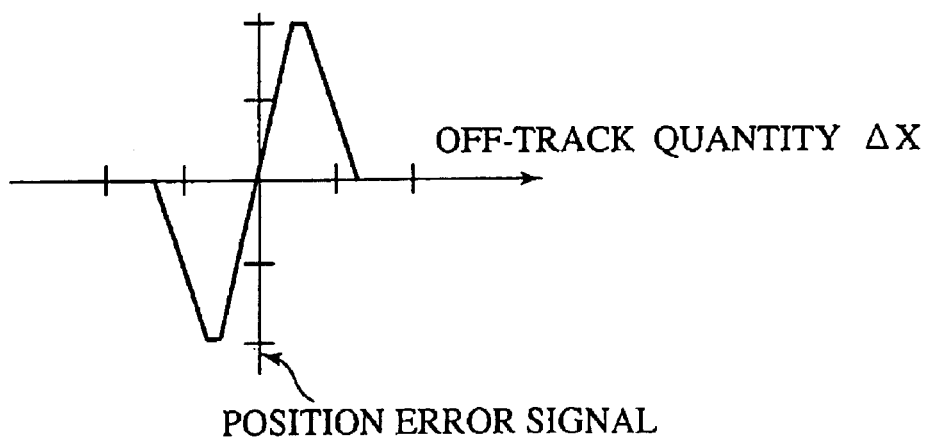

FIG. 16A shows typical examples of servo burst patterns. Servo burst patterns A and B are written in each sector before the data string on which write/read characteristics are tested. The servo burst patterns A and B have offsets in a track crossing direction. FIG. 16A shows relative positions of the servo burst patterns and a data string written on a magnetic disk. An abscissa corresponds to a disk circumferential direction (time axis) and an ordinate corresponds to a disk radius direction (track crossing direction). FIG. 16B shows the amplitudes Sa and Sb of the burst patterns with respect to off-track quantities $\Delta X$ of the head core. FIG. 16C shows a position error signal of Sa−Sb with respect to off-track quantities $\Delta X$.

In FIG. 16A, the burst patterns have off-track quantities of +Tw/2 and −Tw/2, respectively, where Tw is a track width. If the head core 289 of the magnetic head assembly 201 is on-track, the amplitudes of signals made by reading the burst patterns A and B are equal to each other (Sa=Sb). If the magnetic head assembly 201 is off-track, the amplitudes of signals made by reading the burst patterns A and B change (Sa≠Sb) depending on off-track quantities.

A position error detector 259 of FIG. 15 finds the difference between the amplitudes of the two burst signals, converts the difference into a position error signal that is proportional to, for example, a standardized value of (Sa−Sb)/(Sa+Sb), and provides the position error signal to the second adder 267.

In the tracking mode to follow an on-track position, the offset command $\Delta X=0$, and therefore, the position of the microactuator 205 is controlled to zero the position error signal. In the tracking mode, the microactuator 205 is controllable not only to keep an on-track state but also to keep an offset state with respect to a target track. In the latter case, the offset command $\Delta X$ is not zero. Namely, the position of the magnetic head assembly 201 is controlled to an off-track position involving a position error corresponding to $\Delta X$.

As explained above, the absolute coordinates of the magnetic head assembly 201 in the precise positioning mode are provided as the sum of the position command X for the coarse stage 214 and the offset command $\Delta X$ for the microactuator 205. In the tracking mode, the magnetic head assembly 201 is always controlled to follow an offset position $\Delta X$ with respect to a target track containing servo burst patterns.

The servo controller 226 may have an up-down counter to count a head end position signal from the reflective scale 222. According to the count, the microactuator 205 is controlled to realize a track-to-track seek operation. If the head end position signal from the reflective scale 222 indicates that a target track has been attained, the switch 226d is preferably switched to change the precise positioning mode to the tracking mode. Then, on- or off-track control is carried out with respect to the target track according to the amplitude of a servo burst signal.

Third Embodiment

The burst patterns of FIG. 16A provide a position error signal with a linear control range of ±Tw/2 at most even under ideal conditions. The magnetic head assembly 201 usually involves a read/write offset. This type of offset is caused by a skew angle of a magnetic head and corresponds to the difference between the centers of write and read cores of the magnetic head. Taking the offset into account, the linear control range of ±Tw/2 is insufficient for high stability.

Figures 17, 18:
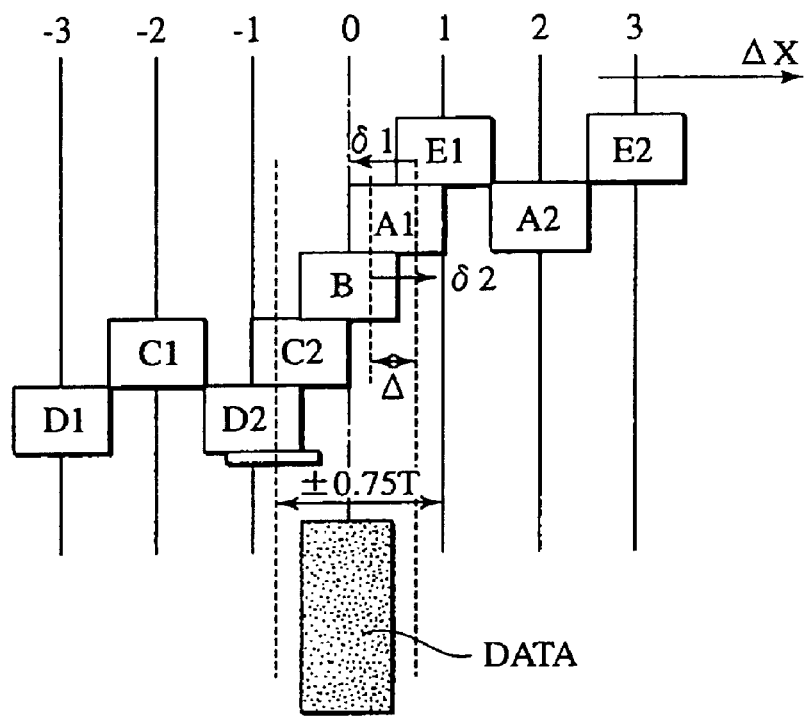
FIG. 17 is an explanatory view showing servo burst patterns according to a third embodiment of the present invention.
FIG. 18 is an explanatory view showing an arrangement of the servo burst patterns according to the third embodiment.

FIG. 17 shows examples of servo burst patterns A to E that expand the linear control range to ±(¾)Tw to detect an off-track of ±3 tracks. The burst pattern B is on-track with $\Delta X=0$, and therefore, corresponds to data patterns. Each of the other burst patterns A, C, D, and E involves two patterns at the same timing on different tracks. FIG. 18 shows the track positions of the burst patterns.

Assuming that Vth is a threshold to determine the presence of a burst pattern, Vt is a control voltage corresponding to a movement of one track distance, Va, Vb, Vc, Vd, and Ve are detected voltages corresponding to the burst patterns A to E, respectively, Vpos(n) is a control voltage at the present sample timing (n), and Vpos(n−1) is a control voltage at the previous sample timing (n−1), tracking control and off-track detection algorithms are expressed as follows:

if{(Va>Ve)&&(Va>Vb)&&(Vb>Vth)&&(Ve>Vth)} Vpos(n)=Ve−Vb+ 0.5*Vt    (Decision expression 1)

else if{(Vb>Va)&&(Vb>Vc)&&(Va>Vth)&&(Vc>Vth)} Vpos(n)= Va−Vc    (Decision expression 2)

else if {(Vc>Vb)&&(Vc>Vd)&&(Vb>Vth)&&(Vd>Vth)}

Vpos(n)=Vb−Vd−0.5*Vt    (Decision expression 3)

else if{(Va>Vth)||(Ve>Vth)} Vpos(n)=Vpos(n−1) (Decision expression 4)

else if{(Vc>Vth)||(Vd>Vth)} Vpos(n)=Vpos(n−1) (Decision expression 5)

The decision expressions 1 to 3 are control expressions when the read head core of the magnetic head assembly 201 is within the linear control range. The decision expressions 4 and 5 are control expressions when the position of the magnetic head assembly 201 is out of the linear control range.

The decision expressions mentioned above will be explained in detail. For the sake of simplicity, an assumption is made that a read core width of the magnetic head assembly 201 is equal to a track width. The same explanation is basically applicable when the read core width is smaller than the track width. In the following explanation, "X" is the position of the center of the read head core of the magnetic head assembly 201 on a track, and the threshold Vth is a voltage attained when reading ¼ of a track width.

Case 1

According to the decision expression 1, a region of Va>Ve is X<(¾)Tw (δ1 of FIG. 17), and a region of Va>Vb is X>Tw/4 (δ2 of FIG. 17). A region of Tw/4<X<(¾)Tw (Δ of FIG. 17) satisfies Vb>Vth and Ve>Vth. The difference between the amplitudes of the burst patterns E1 and B linearly changes around X=Tw/2 that is the center of the region. In this case, the read core of the magnetic head assembly 201 can be controlled to an on-track position by adding a voltage corresponding to Tw/2 as follows:

Vpos(n)=Ve−Vb+0.5*Vt

Case 2

According to the decision expression 2, a region of Vb>Va is X<Tw/4, and a region of Vb>Vc is X>−Tw/4. In a region of −Tw/4<X<Tw/4, the burst patterns A1 and C2 are expected to provide a read output of Vth or over. The difference between the amplitudes of the burst patterns A1 and C2 linearly changes around X=0. In this case, the read core of the magnetic head assembly 201 can be controlled to an on-track position by setting Vpos(n)=Va−Vc.

Case 3

According to the decision expression 3, a region of Vc>Vb is X<−Tw/4, and a region of Vc>Vd is X>−(¾)Tw. In a region of −(¾)Tw<X<−Tw/4, the burst patterns B and D2 provide each Vth or over. The difference between the amplitudes of the burst patterns B and D2 linearly changes around X=−Tw/2. In this case, the read core of the magnetic head assembly 201 can be controlled to an on-track position by setting Vpos(n)=Vb−Vd−0.5*Vt.

Figure 19:
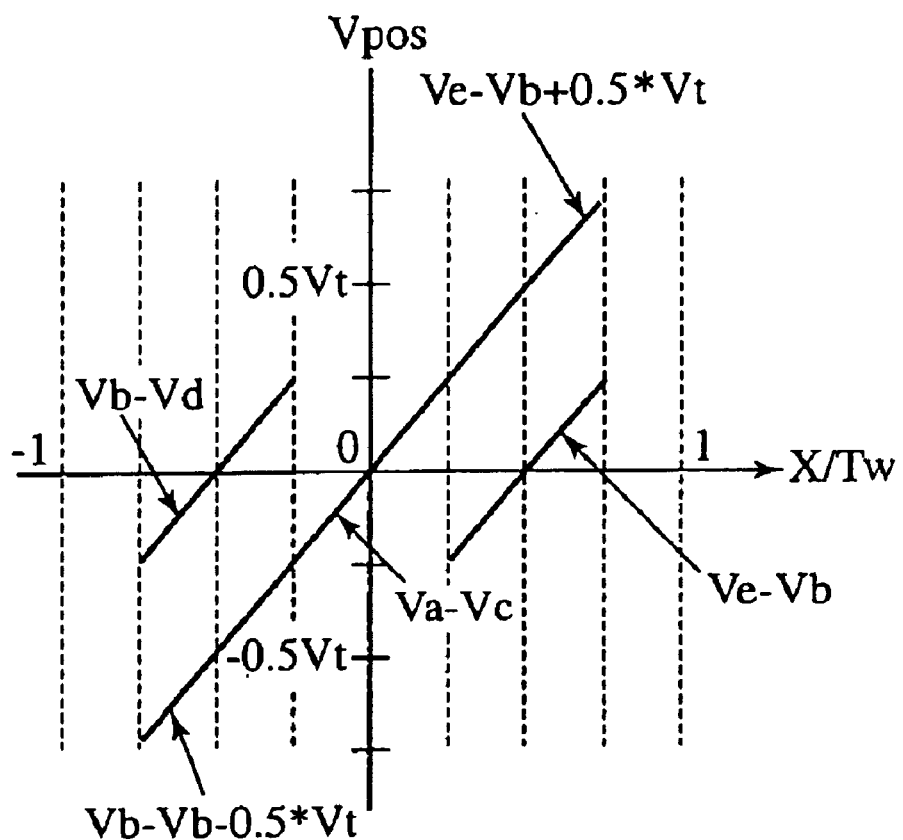
FIG. 19 is an explanatory view showing relationships between off-track quantities and control voltages according to the third embodiment.

FIG. 19 shows relationships between the off-track quantities and control voltages Vpos of the read core of the magnetic head assembly 201 in connection with the decision expressions 1 to 3. If an off-track position is within ±¾ tracks, a control voltage proportional to the off-track quantity is obtainable according to the decision expressions 1 to 3, to achieve not only on-track control but also holding the magnetic head assembly 201 at an off-track position.

Case 4

The decision expressions 4 and 5 are used to detect the off-track direction of an off-track of the magnetic head assembly 201 that is out of the linear control range and shift the magnetic head assembly 201 into the linear control range. The decision expression 4 is used to handle a positive off-track in the range of X<3.75Tw and forcibly subtract one track from the positive off-track.

Case 5

Similarly, the decision expression 5 is used to handle a negative off-track in the range of X>−3.75Tw and adds one track to the negative off-track.

In this way, the third embodiment is capable of achieving linear control within ±¾ tracks. In addition, the third embodiment is capable of detecting an off-track quantity within ±3.75 tracks and shifting the magnetic head assembly 201 into the linear control range.

As mentioned above, the present invention provides a magnetic disk tester having a piezo-stage in the vicinity of a magnetic head core (a magnetic head assembly), a reflective scale with stripes on the piezo-stage, and a laser head on a coarse stage. The laser head emits a laser beam toward the reflective scale. A reflected beam from the reflective scale is received by the laser head. According to the received reflected beam, the tester detects the position of the magnetic head assembly relative to a target track on a magnetic disk, thereby precisely controlling the position of the magnetic head assembly. Unlike the related arts, the present invention is capable of directly sensing the position of the magnetic head assembly (piezo-stage), to greatly improve the positioning accuracy of the magnetic head assembly. According to the present invention, the weight of movable parts of the piezo-stage including the magnetic head assembly is only 2 to 3 grams. This light weight realizes a wide band for a servo positioning system to move the magnetic head assembly onto a target sector of a target track at high speed.

This application claims benefit of priority under 35USC §119 to Japanese Patent Applications No. 2000-345443 filed on Nov. 13, 2000, No. 2001-110514 filed on Apr. 9, 2001, and No. 2001-239418 filed on Aug. 7, 2001, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A head clamping apparatus for a magnetic disk tester which tests electromagnetic transducing characteristics of at least one of a magnetic disk and magnetic head, the head clamping apparatus rotating the magnetic disk having a plurality of concentric tracks and positioning the magnetic head onto a target one of the concentric tracks, and the head clamping apparatus comprising:

a microstage supporting the magnetic head and being moved by a microactuator in a direction crossing the concentric tracks;

wherein the microstage has a base attached to the head clamping apparatus, a stage to hold the magnetic head through a head attachment, and two resilient pieces connecting the base to the stage, the base, the stage, and the resilient pieces forming a parallel plate spring mechanism;

the base has a support protruding toward the stage between the resilient pieces; and the microactuator is arranged between the support and one of the resilient pieces.

2. A head clamping apparatus for a magnetic disk tester which tests electromagnetic transducing characteristics of at least one of a magnetic disk and magnetic head, the head clamping apparatus rotating the magnetic disk having a plurality of concentric tracks and positioning the magnetic head onto a target one of the concentric tracks, and the head clamping apparatus comprising:

a microstage supporting the magnetic head and being moved by a microactuator in a direction crossing the concentric tracks; and wherein a front end face of a stage has a cut to divert an external force applied to the stage into a compressing direction of the microactuator.

3. A magnetic disk tester comprising:

a coarse stage having a head load mechanism on which a head clamp is installed, the head clamp holding a piezo-stage which holds a magnetic head assembly, a reflective scale made of a film being disposed on a hack face of the piezo-stage, and light-shield stripes being deposited on the film at regular intervals;

a laser head attached to the coarse stage having a light emission/reception part facing the light-shield stripes of the reflective scale; and positioning means for controlling a position of the head clamp, the laser head emitting a laser beam, the reflective scale reflecting an emitted laser beam, the positioning means detecting the position of the magnetic head assembly on a magnetic disk according to a reflected laser beam and controlling the position of the head clamp according loan error signal which indicates a difference between a detected position and a reference position.

4. The magnetic disk tester according to claim 3, wherein the positioning means has a precise positioning mode and a tracking mode;

the precise positioning mode controls the magnetic head assembly according to the position of the coarse stage and the position of the magnetic head assembly detected from the reflected laser beam; and the tracking mode reads a servo burst signal recorded on the magnetic disk prior to a data signal being recorded thereon and controls the position of the magnetic head assembly according to a position error signal generated according to the amplitude of the servo burst signal.

5. The magnetic disk tester according to claims 3 or 4 wherein information from the reflective scale is entered into a counting means, an output of the counting means is used to carry out a track-to-track seek operation, and when it is determined that the magnetic head assembly is positioned on a target track, the precise positioning mode is changed to the tracking mode; and information based on the amplitude of the servo burst signal is used to carry out one of an on-track control and an off-track control of the magnetic head assembly with respect to a center of the target track.

6. A head clamping apparatus for a magnetic disk tester, movably supported by a linear coarse stage and comprising:

a linear micromotion stage attached to a head clamp and configured to hold and move a magnetic head assembly in a direction crossing a moving direction of the linear coarse stage;

a reflective scale attached to a back face of the linear micromotion stage, having light-shield stripes formed at regular intervals;

a laser head attached to the linear coarse stage and having a light emission/reception part facing the light-shield stripes of the reflective scale; and positioning means configured to control a position of the head clamp, the reflective scale reflecting a laser beam emitted from the laser head, the positioning means detecting the position of the magnetic head assembly on a magnetic disk according to a reflected laser beam and controlling the position of the head clamp according to an error signal which indicates a difference between a detected position and a reference position.

* * * * *